United States Patent [19]

Gitlin et al.

[11] Patent Number: 5,278,689
[45] Date of Patent: Jan. 11, 1994

[54] GIGABIT PER-SECOND OPTICAL PACKET SWITCHING WITH ELECTRONIC CONTROL

[75] Inventors: Richard D. Gitlin, Little Silver; Zygmunt Haas, Matawan, both of N.J.

[73] Assignee: AT&T Bell Laboratories, Murray Hill, N.J.

[21] Appl. No.: 22,614

[22] Filed: Feb. 19, 1993

Related U.S. Application Data

[63] Continuation of Ser. No. 630,145, Dec. 19, 1990, abandoned.

[51] Int. Cl.⁵ .............................................. H04J 14/08
[52] U.S. Cl. .................................. 359/137; 359/139; 359/140; 370/84; 370/94.1
[58] Field of Search ............... 359/137, 128, 135, 139, 359/140; 370/84, 94.1, 94.2, 94.3, 60, 60.1, 110.1, 112

[56] References Cited

U.S. PATENT DOCUMENTS

| | | | |
|---|---|---|---|
| 4,641,303 | 2/1987 | Vogl | 370/84 |
| 4,788,679 | 11/1988 | Kataoka et al. | 370/84 |
| 4,816,820 | 5/1989 | Davis | 370/84 |
| 4,858,112 | 8/1989 | Puerzer et al. | 370/85 |
| 4,860,003 | 8/1989 | DeLuca et al. | 370/94.1 |
| 4,939,721 | 7/1990 | De Bosio | 359/139 |
| 4,972,408 | 11/1990 | Le Bihan Hervé et al. | 370/84 |
| 5,189,669 | 2/1993 | Nunokawa | 370/84 |

FOREIGN PATENT DOCUMENTS 0264205  4/1988  Japan ............................ H04Q 7/02

OTHER PUBLICATIONS

"Blazenet: A Packet-Switched Wide-Area Network with Photonic Data Path" IEEE Transactioins on Communications; vol. 38, No. 6, Jun. 1990, Haas et al.
"Ultrafast All-Optical Synchronous Multiple Access Fiber Networks" IEEE Journal on Selected Areas in Communications, vol. SAC-4, No. 9, Dec. 1986, P. R. Prucnal et al.
"20 Gbit/s 100 Km Non-Linear Transmission With Semiconductor Source" British Telecom Research Labs, I. W. Marshall et al.; OFC 1990 Postconference Edition, San Francisco, Calif., Jan. 22-25, 1990.
"Terabit Lightwave Networks: The Multihop Approach" AT&T Technical Journal; A. S. Acompora et al.
"Loop Concatenation and Loop Replication to Improve Blazelan Performance" IEEE Journal on Selected Areas in Communications; vol. 8, No. 8, Oct. 1990, Z. Haas.

*Primary Examiner*—Richard E. Chilcot, Jr.
*Assistant Examiner*—Raphael Bacares
*Attorney, Agent, or Firm*—Eli Weiss

[57] ABSTRACT

Currently, with optical time division multiplexing, a switching node is operated at the peak transmission rate. For example, if the data transmission rate is 10 Gbps, the line cards in the switching circuit are also required to operate at this rate despite the fact that the switching node does not actually need to access the data at this rate. Thus, the electronics, which includes the line cards at the switching node, is expensive and less reliable than a low-speed design. In this invention the requirement of operating the switching node electronics at the high speed link bit rate is eliminated by encoding the packet header field at a lower rate than the information in the data field. As a result, the line cards need only operate at the lower header rate. This is possible because the switching node does not need to process the data portion of the packet, but only the header information. The high-speed data portion of the packet is not optically to electrically converted at the switching node, but it passes almost transparently through the switching node. The invention also discloses overlapping several logical networks on the same physical network.

2 Claims, 5 Drawing Sheets

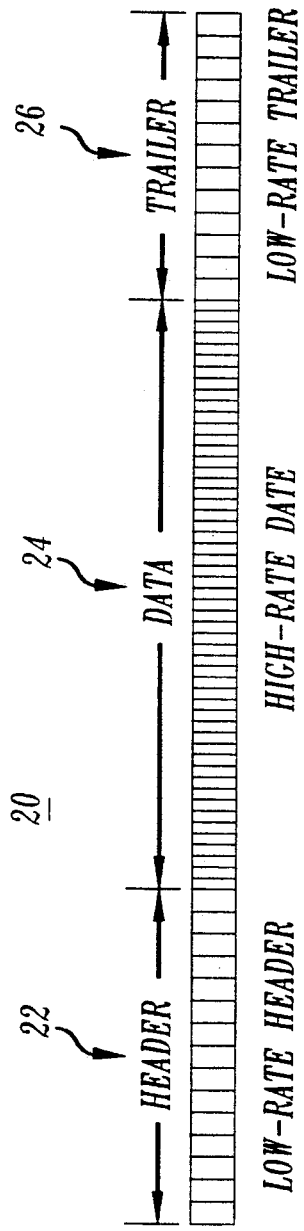
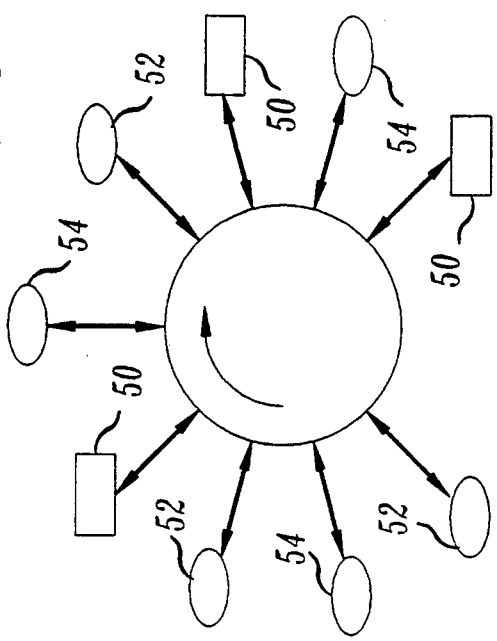
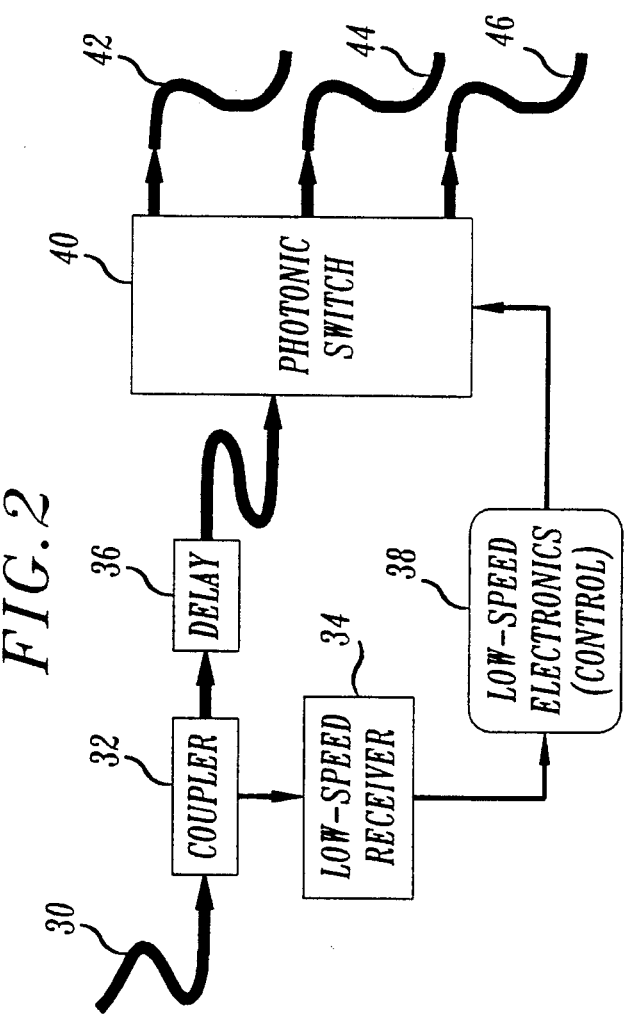

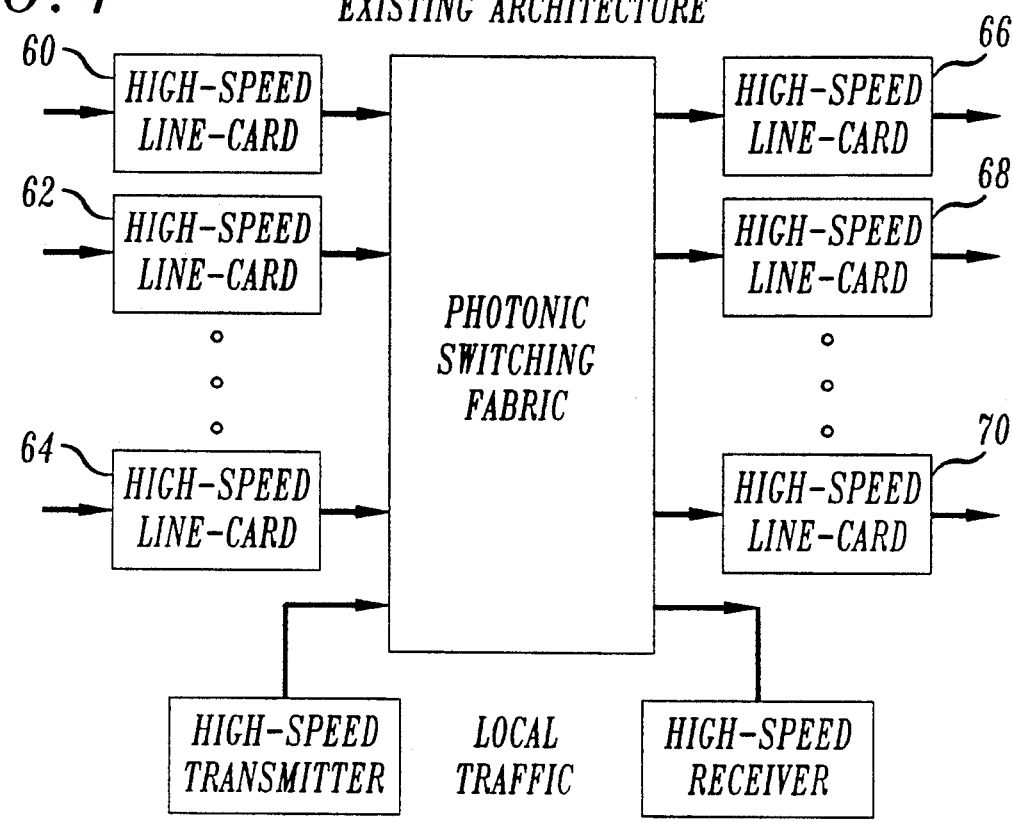
FIG. 4  EXISTING ARCHITECTURE
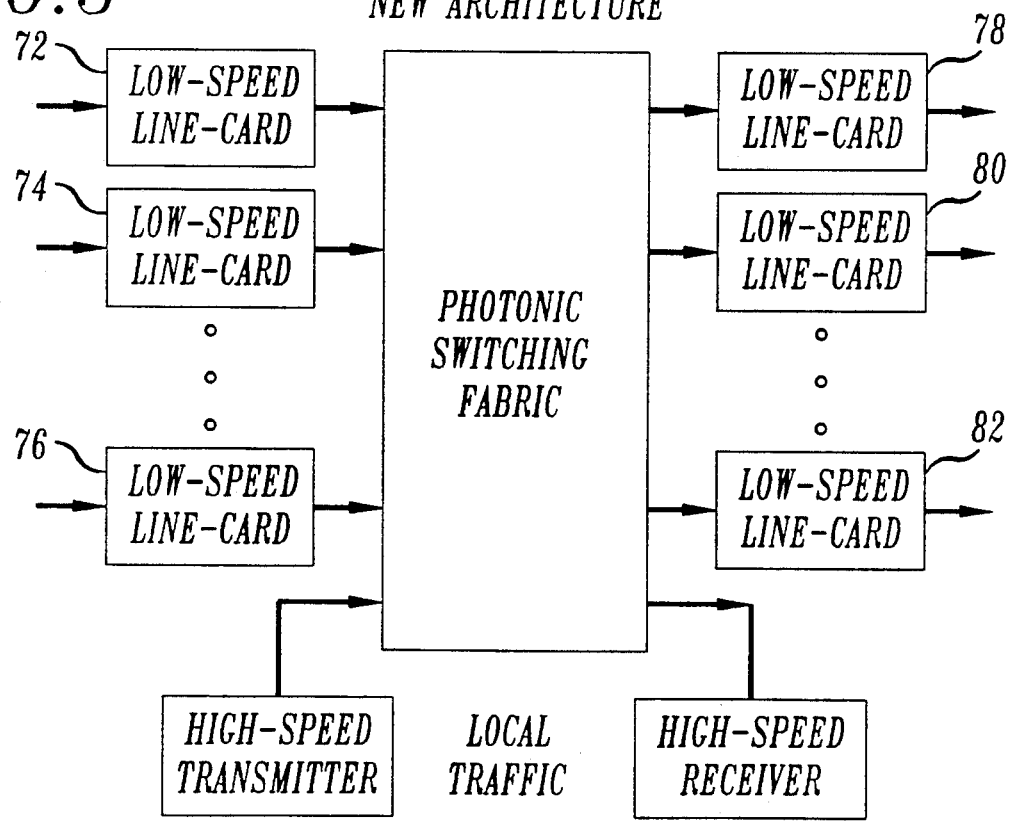
FIG. 5  NEW ARCHITECTURE

GIGABIT PER-SECOND OPTICAL PACKET SWITCHING WITH ELECTRONIC CONTROL

This application is a continuation of now abandoned application Ser. No. 07/630,145, filed on Dec. 19, 1990.

TECHNICAL FIELD

This invention relates generally to optical networks and more particularly to the method and apparatus of bit encoding of an optical packet.

BACKGROUND OF THE INVENTION

The advent of gigabit-per-second packet networks has focussed the attention of optical network system designers on the need to provide selected users with gigabit-per-second network access together with a high-speed multiplexing system which can be used to access an optical channel. One approach frequently suggested is the use of lower speed channels with wavelength division multiplexing. Unfortunately, since this approach requires dividing or "chopping" the high speed traffic into multiple streams for transmission on several channels, relatively complex traffic synchronization and/or reassembly procedures are required at the receiving end. It is noted that statistical time division multiplexing does not suffer from this disadvantage. It does, however, require electronic switching of multiplexed traffic at the peak channel rate. Switching at this high rate is both complex and expensive because this is the rate at which a line card of a switching node must operate. For example, if the transmission rate of the data is 1 Gbps, the line card must detect and process the packets at 1 Gbps. Very high speed electronics is expensive and the technology is, as yet, not sufficiently mature. Thus, there is a need to avoid the limitations of high speed electronics.

SUMMARY OF THE INVENTION

Currently, with optical time division multiplexing, the switching node is operated at the peak transmission rate. For example, if the data transmission rate is 10 Gbps, the line cards in the switching circuit are also required to operate at this rate despite the fact that the switching node does not actually need to access the data at this rate. Thus, the electronics, which includes the line cards at the switching node, is expensive and less reliable than a low speed design. In this invention, the requirement of operating the switching node electronics at the high speed link bit rate is eliminated by encoding the packet header field at a lower rate than the information in the data field. As a result, the line cards need only operate at the lower header rate. This is possible because the switching node does not need to process the data portion of the packet, but only the header information. The high-speed data portion of the packet is not optically to electrically converted at the switching node, but passes almost transparently through the switching node.

BRIEF DESCRIPTION OF THE DRAWING

FIG. 1 is an illustration of a packet in accordance with the principles of the invention;

FIG. 2 is an illustration of a switching structure in accordance with the principles of the invention for switching and processing the packet of FIG. 1;

FIG. 3 is an illustration of a network in accordance with the principles of the invention wherein several logical networks are overlayed as a single optical physical network;

FIG. 4 is an illustration of an existing architecture of a switching node of a multi-hop network;

FIG. 5 is an illustration of the architecture of FIG. 4 with low-speed line cards being substituted for the high-speed line cards;

DETAILED DESCRIPTION

Figure 6:
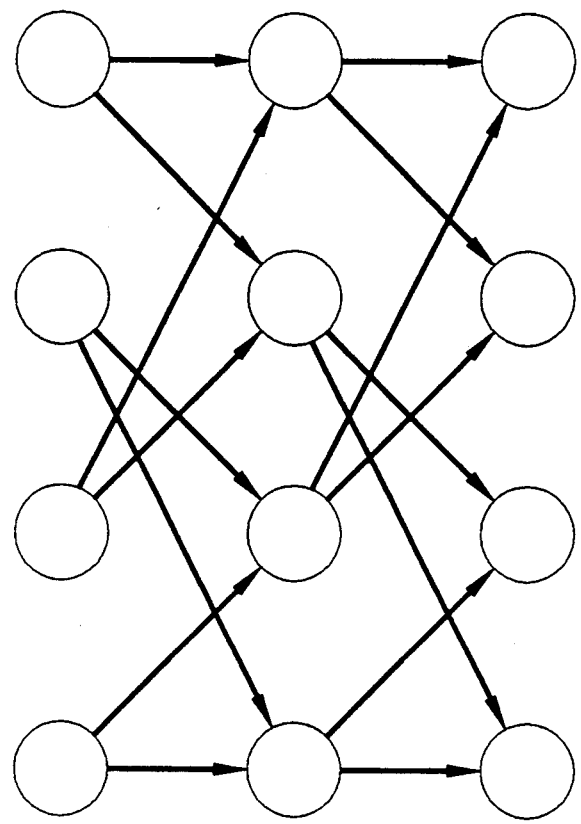
FIG. 6 is an illustration of an 8×8 Shufflenet.

Optical transmission systems can be classified as being "all optical networks" or "almost all optical networks." In these networks, messages and/or packets are converted to an optical signal upon their entry into the network, where they are then forwarded and switched as optical signals within the network. At the destination, they are converted back into an electrical signal. The difference between "all" and "almost all" optical networks is that in "almost all" optical networks the data path is optical, but the switching control is electronic. In contrast, in "all" optical networks, the complete network, the links, switching nodes and network interfaces are fully optical. Thus, in the "all" optical network the logic elements and memory are optical. An example of an "almost all" optical network is disclosed in the "IEEE Transactions on Communications", June, 1990; "Blazenet" by Z. Haas et al. An approach to an "all" optical network is disclosed in the "IEEE Journal on Selected Areas in Communications", December 1986, "Ultrafast All-Optical Synchronous Multiple Access Fiber Networks" by P. R. Prucnal et al.

A primary reason for using an "almost all" optical network having an optical transport in combination with electronic control processing is to preserve the investment which has been made in hardware and in media deployment as the network bit rate increases. Advances in optical hardware products may make the electronic switching nodes of today's networks obsolete. As noted in "OFC 1990 Postconference Edition, San Francisco, Calif. Jan. 22–25, 1990, "20 Gbit/s 100 km Non-Linear Transmission With Semiconductor Source" by I. W. Marshall et al.; the bandwidth distance of 2000 Gbps·km is achievable today.

The main objection to optical high-speed time division multiplexing is the requirement that the switching node must operate at the peak transmission rate. If, for example, the data transmission rate is 10 Gbps, than the line cards in the switching node are also required to operate at this rate, despite the fact that the switching node does not actually need to access the data at this rate. Electronics operating at 10 Gbps are relatively expensive and, in addition, the technology is not fully developed. In this invention, we solve this problem by separating the switching operation from the transmission operation. Such separation provides the additional advantage of permitting independent changes in the switching of the optical signals or in the transmission facilities. Thus, for example, increasing the data rate to 100 Gbps requires virtually no change in the switching nodes.

In this invention, the separation is obtained by using different bit rates for the header field, the trailer field, and the data field of the optical packet. Hence the name field coding. Referring to FIG. 1, there is illustrated a packet in accordance with the principles of the invention. In FIG. 1, the packet 20 can comprise a header section 22, followed by a data section 24, which may be followed by a trailer section 26. When the packet is formed, the header section 22 and the trailer section 26 are encoded with information at a rate which is compatible with the operating speed of the electronic switching or processing equipment. The data section 24, however, is encoded with information at a rate which is compatible with the speed of the transmission links. Since the switching node does not need to process the data section of the packet, the switching node can operate at the lower header rate, and the fast rate data field can pass almost transparently through the switch. Thus, as the data portion of the packet is not converted by the switch from its optical form to an electrical signal, the structure for switching the optical signal is that of an almost all optical network.

Referring to FIG. 2, there is illustrated a structure in accordance with the principles of the invention for operating a switch at a speed commensurate with the level of processing required to support a very much higher speed network operation. A signal comprising a packet of the type disclosed in FIG. 1, which has a low rate header section and a high rate data section, is transmitted from a station along an optical fiber link 30 to an optical coupler 32. The optical coupler 32 diverts a small portion of the optical signal in the optical link 30 to a low speed receiver 34, and the major portion of the optical signal is passed by the coupler through a delay 36 to a photonic switch 40. The low speed receiver detects and reads the header information of the packet received at the lower header rate. The low speed electronic signal from the low speed receiver is directed to a low speed electronic control 38, which is coupled to control the operation of a photonic switch 40 to direct the optical signal from the delay 36 to a desired optical link 42, 44 or 46, for transmission to the header designated destination. Other operations based on processing of the low-speed header may be performed.

Thus, the control 38 sets the transmission path through the photonic switch. The packet is temporarily delayed in the delay line 36 to compensate for the electrical control processing time and for the time required to activate the photonic switch 40. It is to be noted that the high rate data signal is not processed at any time during the switching operation. Thus, it can be stated that the switching process is transparent to the high rate data information. Optical amplification of the optical signal may be required, depending on the network parameters.

The need for very fast electronic memories for electronic switches is one of the parameters that determines how fast a switching node can operate. In optical implementation, the optical memory can be a problem. Large and fast optical random access memories are difficult to implement. Some architectures such as, for example, Blazenet, cope with this limitation of photonics by employing an alternative network architecture that effectively reduces or totally eliminates the need for local buffering within the switching nodes. In Blazenet, for example, it is done by utilizing the inherent storage of the optical media to provide buffering. Contention resolution can be performed in "almost all" optical networks by Blazenet/Blazelan line architecture,
Hot potato routing,
Local optical delay-line buffering, and/or other approaches.

It is possible to implement the idea of field coding by Time Division Multiplexing (TDM), Wavelength Division Multiplexing (WDM) or Space Division Multiplexing (SDM). Thus, the low-speed control channel can be realized as time-multiplexed on the same channel (TDM), on a different wavelength (WDM), or even as a totally different fiber (SDM). An advantage of the TDM system is that it readily provide framing information. However, some of the data channel capacity is wasted due to the low rate header. In WDM and SDM this wasted capacity can be confined to a separate channel to increase the available data capacity. However, WDM and SDM may be more expensive to implement and impractical in long span network because of the synchronization problem.

Referring to FIG. 3, there are illustrated several logical networks overlaid on a single physical network using the principles of this invention. For example, assume an environment where there is a need for an interconnect network to support three separate networks such as 10 Mbps (Ethernets) 50, 100 Mbps Fiber Data Distribution Interface (FDDIs) 52, and 1 Gbps (high speed LANs) 54 coupled to form a ring. It is, of course, possible to build three separate physical networks. However, another approach is to integrate all the three networks on the same physical networks, by using the field-coding technique. Such an arrangement is shown in FIG. 3. The header structure on the ring contains a simple two-bit indication to identify network a packet belongs to. Every node has the capability to read the low-speed header and determine whether the packet belongs to its network. If so, the packet may be extracted from the ring, by the receiver that is compatible with the data rate of the packet. If not, the data-field is not read. Thus, for example, only 10 Mbps capability is required in the nodes that belong to the 10 Mbps network. The major advantage of such an arrangement is that it reduces the amount of required fiber; i.e., a single physical media is shared by several different and distinct networks. Moreover, upgrading a network nodes requires changes only in the node design, not in the fiber routing. Thus, for instance, there is no need for any fiber rerouting for a customer that is connected to the 10 Mbps network and needs a new connection to the 100 Mbps network.

Encoding the header and the data at different signaling rates, as disclosed here, is particularly attractive in multi-hop networks. In multi-hop networks, the switching nodes must examine a packet upon its arrival to determine on which output port the packet is to be sent. If the header is low-rate encoded, the line card circuits that are responsible for examining the packet header can be significantly simplified. This is illustrated in FIGS. 4 and 5.

FIG. 4 illustrates the architecture in use today. FIG. 5 illustrates the architecture which can be substituted for the currently used architecture when using the principles of the invention. In FIG. 4 each of the various high speed line cards 60, 62, 64, 66, 68 and 70 can be removed and replaced with low speed line cards 72, 74, 76, 78, 80 and 82 as shown in FIG. 5.

Of course, the local traffic still needs to be modulated/received by a high speed transmitter/receiver. However, this requires only a single high-speed transmitter/receiver per switching node. Thus, the saving is very dramatic in a network with nodes that have a large number of incoming/outgoing links.

In a hot-potato network, a packet that cannot be forwarded on the required link because the link is used by another packet, is sent on another free link, possibly even in the wrong direction. Hot-potato networks do not require switching memory and, therefore, are suitable for "almost-all" optical implementation. The issue of resolution of contention is non-existent in a hot-potato routed network because blocked packets need not be stored. A possible hot-potato architecture is Shufflenet network as illustrated in FIG. 6. See "AT&T Technical Journal" November/December '87, "Terabit Lightwave Networks; The Multihop Approach" pages 21–34.

Figure 7:
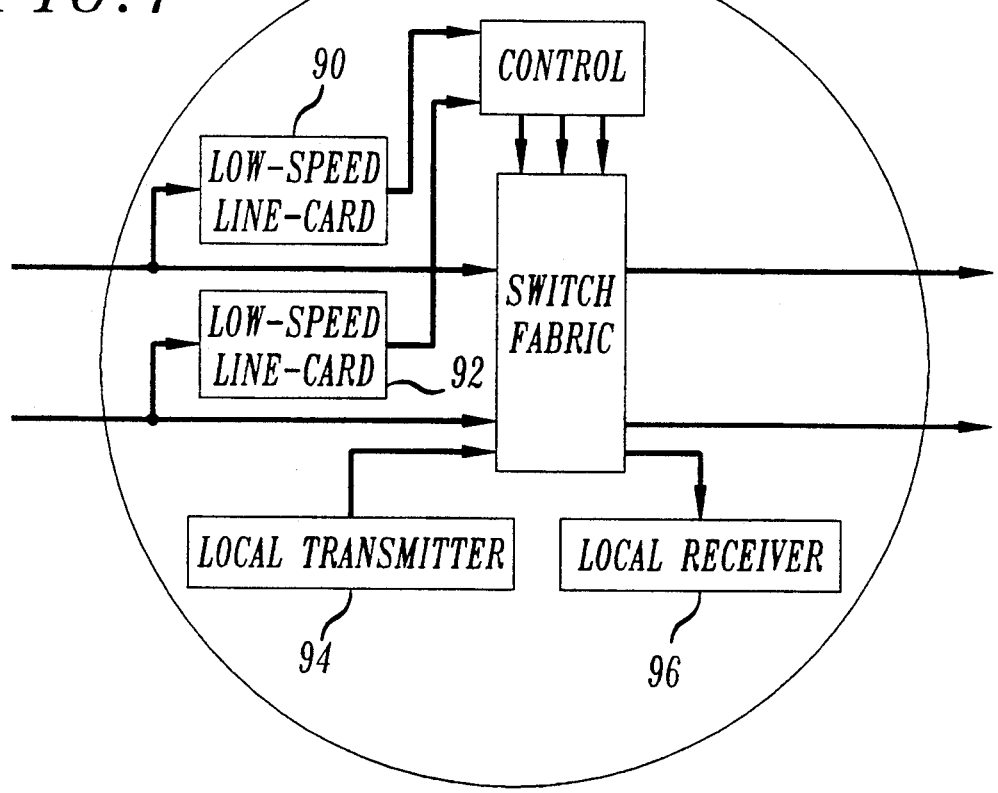
FIG. 7 is an illustration of a switching node for use in a Shufflenet network having a header rate of 100 Mbps and a data rate of 1 Gbps.

A Shufflenet switching node design, when using field coding in accordance with the principles of this invention with a low rate header and high speed data, is illustrated in FIG. 7. It is to be noted that the two line cards 90, 92 are designed to operate at the lower rate. Only the local traffic transmitter 94 and receiver 96 need to have high speed capability.

Figure 8:
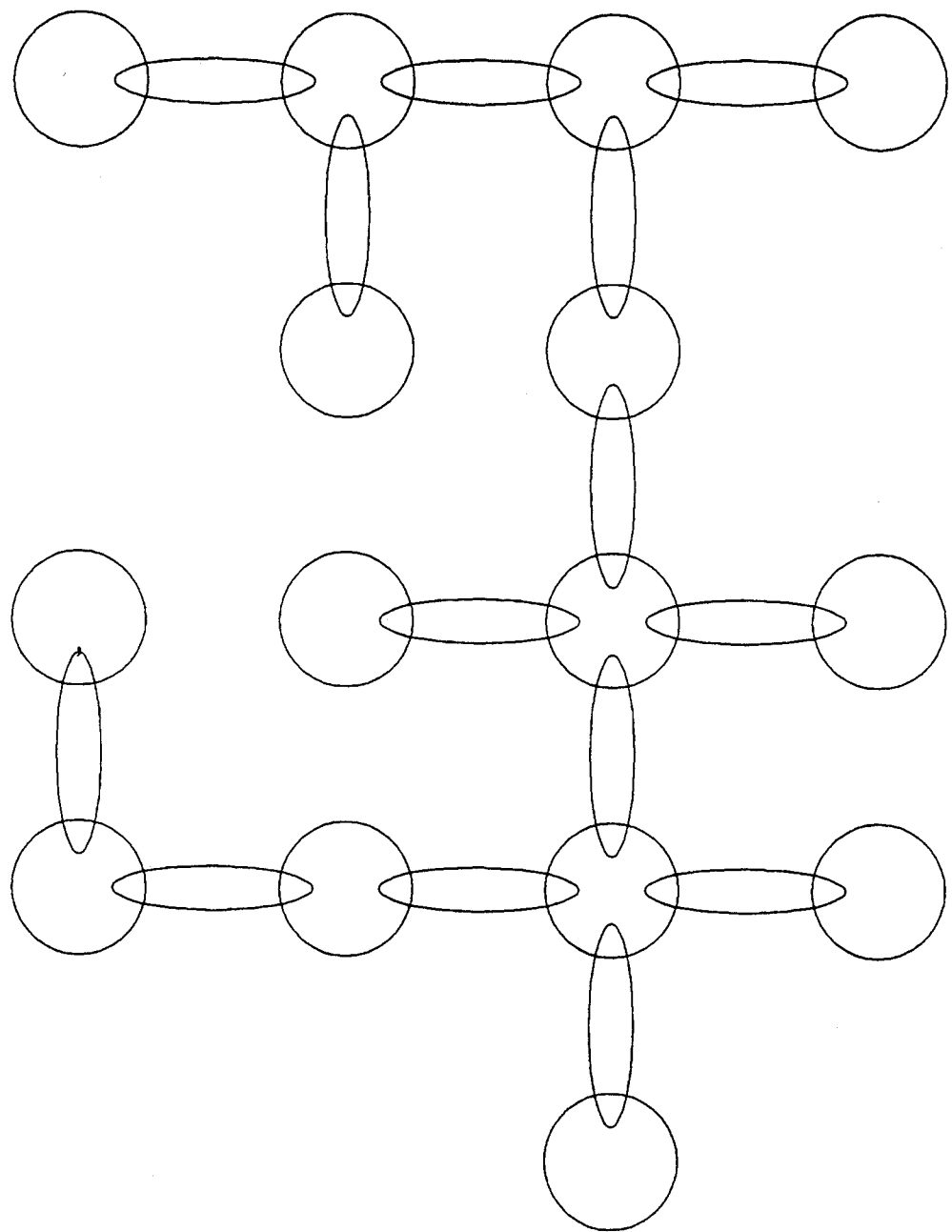
FIG. 8 is an illustration of a Blazenet network
Figure 9:
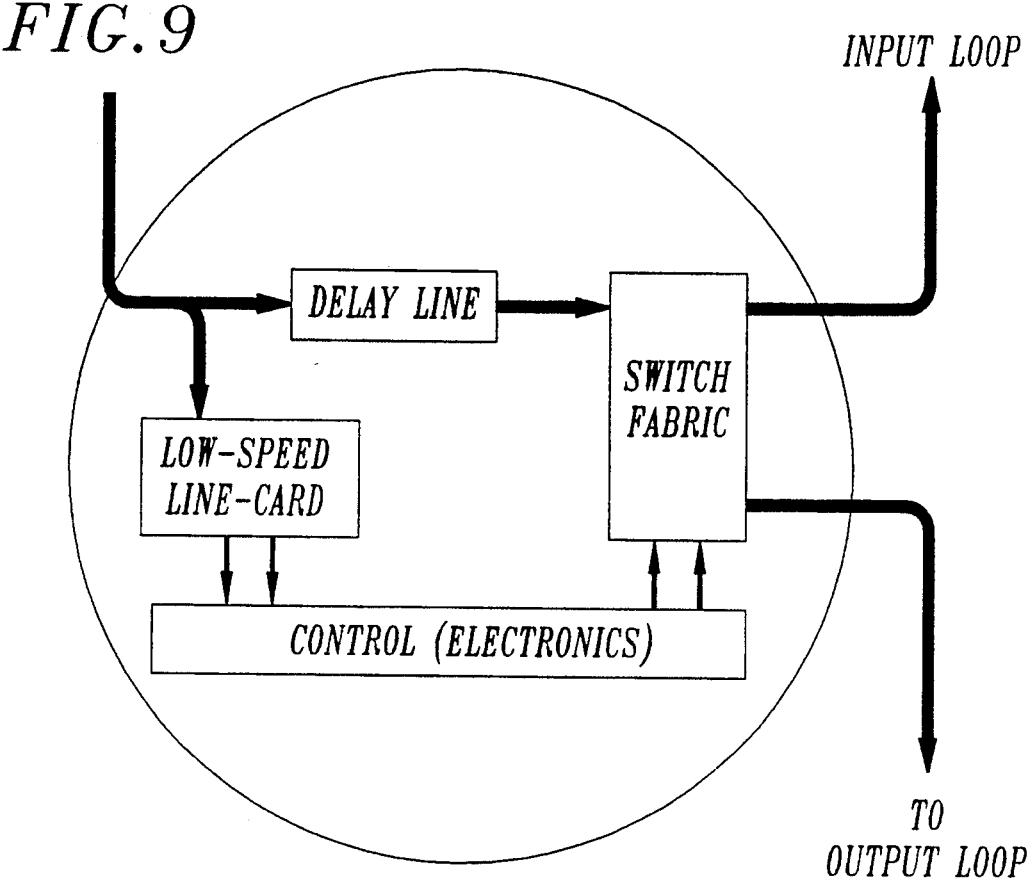
FIG. 9 is an illustration of a switching node in accordance with the principle of the invention for use in the network of FIG. 8.

Blazelan is an "almost-all" optical network. See U.S. Pat. No. 4,970,717. It uses the fiber link storage as contention buffering scheme; i.e., blocked packets are recirculated in the optical links. Blazelan is a particularly attractive scheme to be used in conjunction with the field-coding technique, since the contention is resolved without the need to locally buffer the data. The network is targeted towards very high-speed communication with the simple source-routing algorithm. Moreover, it is a multi-hop network, and, therefore most of the traffic handled by an "average" switching node is through traffic rather than local traffic, and data field of through traffic need not to be detected. In fact, the connectors that are used to increase the distance between switching nodes have no local traffic, and therefore can be built inexpensively. Moreover, since the loop-replication technique that is used to reduce the effect of input queueing on the Blazelan switch performance increases the number of line-cards, the field-coding technique may considerable reduce the cost of the implementation of the loop-replication technique. An example of a Blazelan network is illustrated in FIG. 8 and an illustration of a switching node for use in the network of FIG. 8 which operates with a field coded packet, as here disclosed, is illustrated in FIG. 9.

Figure 10:
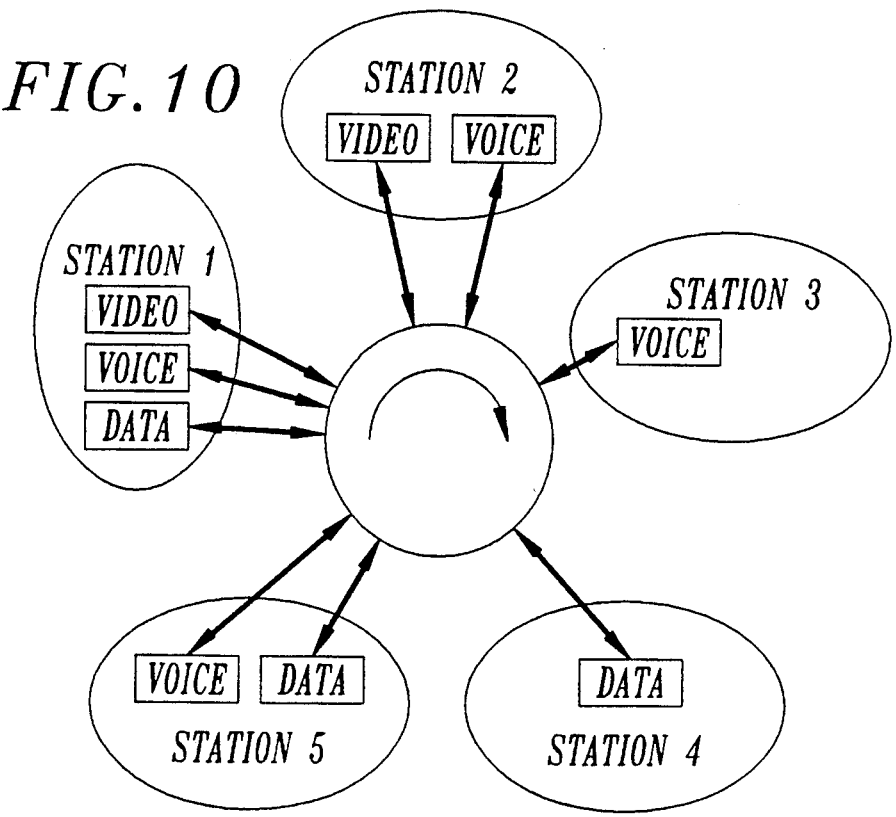
FIG. 10 is an illustration of a network for multimedium traffic integration in accordance with the principles of the invention.

High-speed user access is an important challenge the research community is struggling to solve. As local-area networks are increasing in speed, there is a need for high-speed interconnection, so that the high-speed user access will not be slowed down by the interconnection bottleneck. An approach would be to use a Metropolitan Area Network (MAN). Unfortunately, MANs are designed today to support speeds comparable with LANs. Thus interconnecting LANs with MANs results in the interconnection bottleneck. Consequently, a new type of interconnection is needed that will be able, on one hand, to support user rates comparable to the LAN rates and, on the other hand, provide aggregate throughput well above single user access. Moreover, such a network is required to provide connectivity among different and incompatible LANs. We have presented such an interconnection scheme that is based on the separation of transmission from switching. The ever increasing transmission rates will have virtually no effect on the design of the switching hardware. Thus the field-coding scheme preserves investment. Moreover, different and distinct networks can be integrated over the same optical subnet. This may be in particular attractive to achieve multi-media traffic integration, especially, since users may require different services. Thus, for example, if a user requires no video, the user connection to the video rate may be missing. Such an arrangement is shown in FIG. 10.

We claim:

1. The method of interconnecting at least two logical networks where a first logical network operates at a first bit rate and a second logical network operates at a second bit rate, and each logical network is adapted to receive information via an optical packet having a header field and a data field;

comprising the steps of connecting the first logical network to an optical fiber for receiving an optical packet, the first logical network being adapted to detect a header field at a third bit rate and a data field at the first bit rate where the first bit rate is greater than the third bit rate, connecting the second logical network to the optical fiber for receiving an optical packet, the second logical network being adapted to detect a header field at the third bit rate and a data field at the second bit rate where the second bit rate is greater than the third bit rate and is not equal to the first bit rate, encoding a packet for transmission via the optical fiber to the first and second logical networks with header information at the third bit rate which is detectable by both the first and second logical networks and encoding the packet with data information at either the first or the second bit rate for detection by only one of the first or second logical networks.

2. The method of claim 1 wherein the optical packet has a trailer field further comprising the steps of encoding the packet with trailer information at the third bit rate which is detectable by both the first and second logical networks.

* * * * *